United States Patent [19]
Hanson et al.

[11] Patent Number: 6,037,962
[45] Date of Patent: Mar. 14, 2000

[54] METHOD AND APPARATUS FOR INTERLEAVING RASTER SCAN LINES IN A MULTI-BEAM LASER IMAGING DEVICE

[75] Inventors: Gary E. Hanson, Meridian; Phillip R. Luque, Boise, both of Id.

[73] Assignee: Hewlett-Packard Company, Palo Alto, Calif.

[21] Appl. No.: 09/055,100

[22] Filed: Apr. 3, 1998

[51] Int. Cl.[7] .............................. B41J 2/375; G01D 15/14
[52] U.S. Cl. .............................................................. 347/233
[58] Field of Search .................................... 347/233, 237, 347/241, 243; 395/111, 117, 109

[56] References Cited

U.S. PATENT DOCUMENTS 5,691,759  11/1997  Hanson ................................... 347/233

*Primary Examiner*—William Royer
*Assistant Examiner*—Greg Moldafsky

[57] ABSTRACT

A laser printer produces an image of raster scan lines exhibiting a pitch distance p. The printer includes a photoreceptor and n laser sources, where $n \geq 2$. First and second sets of laser sources, in one embodiment, produce plural optical beams which, when imaged on the photoreceptor, are separated by pitch distance p in the direction of movement of the photoreceptor. The first set and second sets of laser sources are separated by a distance $S_{PR}=c(1+qr)p$, where: c=number of laser sources in each set, q=an integer, and r=number of rows of laser sources in both the first and second sets. The optical beams are modulated with pixel value data in accordance with a correspondence of image scan lines and positions of the optical beams on the photoreceptor. The photoreceptor is moved by a distance $(q \cdot c \cdot r)p$ between scans. In such manner, an interleaving of the scan lines is achieved, which allows substantial separation of laser diodes on a laser diode chip.

15 Claims, 3 Drawing Sheets

\* ALTHOUGH THESE LINES ARE SCANNED THEY WOULD NOT BE PRINTED

A1 = LASER A, SCAN 1
D4 = LASER D, SCAN 4
ETC.

METHOD AND APPARATUS FOR INTERLEAVING RASTER SCAN LINES IN A MULTI-BEAM LASER IMAGING DEVICE

FIELD OF THE INVENTION

This invention relates to laser printers and copiers and, more particularly, to a method and apparatus for enabling a multi-beam laser copier/printer to print interleaved, high resolution, raster scan lines from widely spaced laser sources.

BACKGROUND OF THE INVENTION

Efforts are continually being made to increase the printing/copying speed of laser printers and copiers while, at the same time, reducing their cost.

One such laser printer/copier scans one or more laser beams over the surface of a photoreceptor in a repetitive raster fashion, using a rotating polygonal mirror.

In order to increase the speed of operation of such a device, the prior art has attempted to use plural, concurrently scanned, laser beams to achieve an increase of the exposure/print speed. Mochizuki et al. describe such a system in "Dual Beam Diode Laser Scanning System for High Speed Laser Beam Printers" Proceedings of the I, S and T Conference, Japan 1993, pages 222–225. To achieve their dual beam scan system, Mochizuki et al. employ isolated diode lasers whose laser beams are fed through complex optical pathways to a scanning mirror. A rotationally asymmetric aspheric lens is employed to enable use of long wavelength diode lasers. Complex optical pathways and lenses add significant cost to the printer/copier.

In U.S. Pat. No. 5,691,759 to Hanson, assigned to the same Assignee as this application, a laser printer is disclosed which produces a raster image of plural scan lines of image pixels, each raster scan line separated from an adjacent raster scan line by a pitch distance p. The printer includes a movable photoreceptor and n laser sources, where $n \geq 2$. The n laser sources produce n optical beams that, at the photoreceptor, are separated by a distance of $(n+1)p$ in a direction of movement of the photoreceptor. A scanner scans the plural optical beams in parallel paths across the photoreceptor, as they are modulated in accordance with raster scan line pixel data provided from an image buffer. At the completion of each scan, the photoreceptor is moved by a distance $(n \times p)$, and the n optical beams are again modulated with pixel values from another set of raster scan lines that are respectively, $(n+1)p$ distant from the raster scan lines of the first scan. In such manner, an interleaving of the scan lines is achieved, using plural optical beams from a single laser diode chip, to produce the n laser beams. The disclosure of U.S. Pat. No. 5,691,759 is incorporated herein by reference.

The required resolution of newly designed laser print engines is now up to 1200 dots per inch (dpi), which equates to inter-dot spacings of about $21\mu$. Currently available low cost laser scan mechanisms cause a 5× to 10× magnification, at the photoreceptor, of the inter-beam spacings.

When diode lasers are integrated into a single chip structure, if their inter-diode spacings are less than about $50\mu$, thermal effects between adjacent diodes begin to affect system performance.

In the system described by Hanson in U.S. Pat. No. 5,691,759, the inter-diode spacing in the process (or paper-movement) direction is fixed by the expression $(n+1)p$, where n is the number of lasers and p is the required inter-dot pitch distance on the photoreceptor. If 4 lasers are incorporated into a laser chip, as shown in FIG. 8 of Hanson, the required inter-diode spacing is $(4+1)p$ or $104\mu$ at $p=21\mu$ on the photoreceptor (in a system where there is no magnification in the projection path). To produce a resolution level of $21\mu$ between dots on a photoreceptor with a 5× magnifying scanner, requires that the inter-diode spacings on the laser chip be about $21\mu$ (i.e., 104/5), which is less than half the required inter-diode spacing.

Accordingly, it is an object of this invention to provide an improved method and apparatus for employing multiple beams to scan a photoreceptor in a laser imaging device.

It is another object of this invention to provide an improved multi-beam, scanned laser imaging device wherein plural laser diode sources are utilized that are spaced in a manner to avoid inter-diode effects.

SUMMARY OF THE INVENTION

A laser printer produces an image of raster scan lines exhibiting a pitch distance p. The printer includes a photoreceptor and n laser sources, where $n \geq 2$. First and second sets of laser sources, in one embodiment, produce plural optical beams which, when imaged on a photoreceptor, are separated by pitch distance p in the direction of movement of the photoreceptor. The first set and second sets of laser sources are separated by a distance $S=c(1+qr)p$, where: c=number of laser sources in each set, q=an integer, and r=number of rows of laser sources in both the first and second sets. The optical beams are modulated with pixel value data in accordance with a correspondence of image scan lines and positions of the optical beams on the photoreceptor. The photoreceptor is moved by a distance $(q \cdot c \cdot r)p$ between scans. In such manner, an interleaving of the scan lines is achieved which allows substantial separation of laser diodes on a laser diode chip.

BRIEF DESCRIPTION OF THE DRAWINGS

FIG. 4b is a chart which schematically illustrates an interleaving of scan lines on a photoreceptor that are produced by the subset of the laser diodes of FIG. 4a.

DETAILED DESCRIPTION OF THE INVENTION

Figure 1:
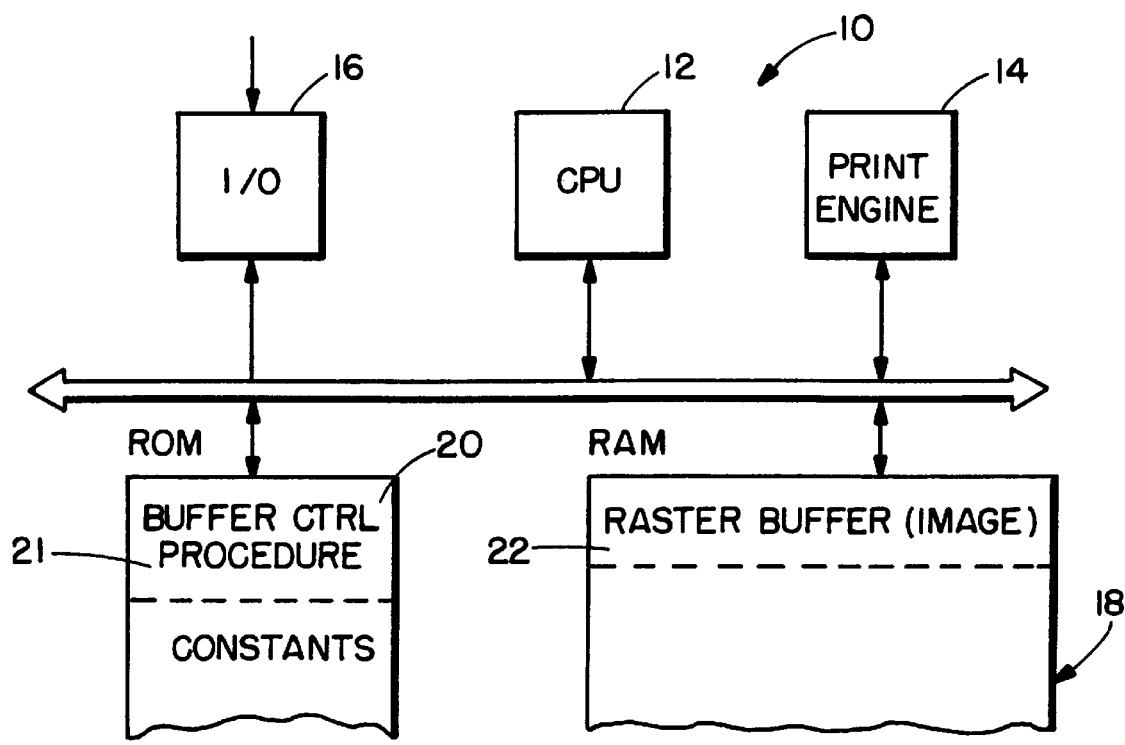
FIG. 1 is a block diagram of a printer system for performing the invention hereof.

FIG. 1 is a high-level block diagram of a laser printer 10, including a central processing unit 12, a laser print engine 14 and an input/output module 16 for receiving image data from a host processor.

Printer 10 further includes a random access memory (RAM) 18 and a read-only memory (ROM) 20. RAM 18 includes a portion which serves as a raster image buffer 22. As known to those skilled in the art, raster image buffer 22 stores plural raster lines of an image in the form of pixel values. Those pixel values, when fed to print engine 14, enable output of an image onto a media sheet.

ROM 20 includes a buffer control read-out procedure and further includes a set of constants which indicate the number of laser diodes present in print engine 14 and the physical arrangement thereof (to enable an adjustment of scan actions if one or more is offset from the beginning of a scan line).

Figure 2:
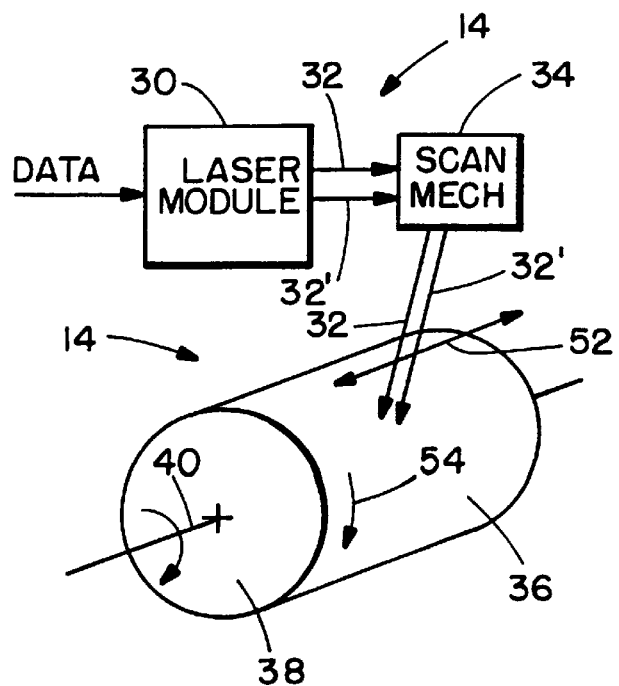
FIG. 2 is a more detailed block diagram of a laser print engine shown in block form in FIG. 1.

FIG. 2 shows details of print engine 14 and illustrates a laser module 30 which outputs a plurality of laser diodes that produce laser beam sets 32, 32'. The laser beam sets are respectively modulated in accordance with input pixel data (with only two laser beam sets shown to avoid overcomplicating the FIG. ). Laser beam sets 32, 32' are directed at a scan mechanism 34 which, in the known manner, causes beam sets 32, 32' to be scanned across a photoreceptor 36 on a drum 38. Motive means (not shown) are connected via a shaft 40 to drum 38 and enable rotational movement thereof.

To assure a proper sequencing of pixel data from raster buffer 22 to print engine 14, buffer control procedure 21 (in ROM 20) initially calculates which lines of the raster image will be fed to modulate the respective laser diodes. The movement of drum 38 and data output from raster buffer 22 to print engine 14 must be controlled to enable all of the data from raster buffer 22 to be output in a manner to assure that all data is properly written by the laser diodes onto photoreceptor 36. Such control is achieved through control of print engine 14 by CPU 12 and buffer control procedure 20.

Figure 3:
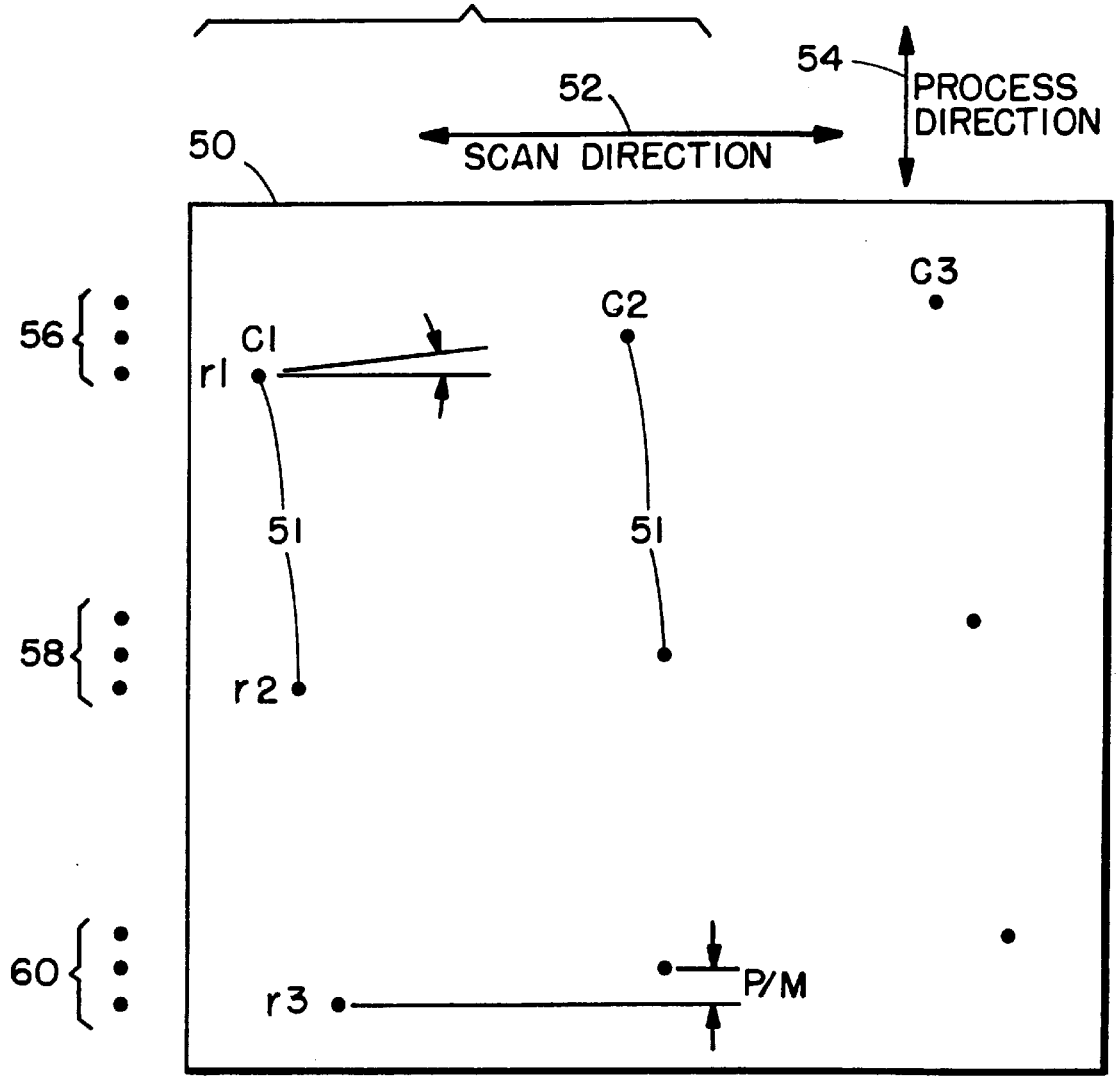
FIG. 3 schematically illustrates a semiconductor chip having plural laser diodes integrated thereinto.

FIG. 3 illustrates, schematically, a semiconductor chip 50 which includes a plurality of laser diodes that are arranged in rows and columns. In specific, FIG. 3 illustrates three rows r1, r2, and r3 and three intersecting columns c1, c2 and c3. Positioned at the intersection of each row and column is a laser diode 51. Laser beams which emanate from the laser diodes positioned along a row are hereafter referred to as a laser beam set or beam set.

With reference back to FIG. 2, laser diode chip 50 is positioned in laser module 30 and scan mechanism 34 scans the plurality of laser beam sets which emanate therefrom in the direction indicated by scan direction arrows 52. It is to be hereafter assumed that scan mechanism 34 subjects laser beam sets 32 and 32' to a magnification M. Photoreceptor 36 is moved by drum 38 in a process direction 54.

Returning to FIG. 3, each of rows r1, r2, r3 of laser diodes 51 is oriented at an angle θ with respect to scan direction 52 so that the laser diodes that are positioned along a row are offset from each other by a distance p/M, where: p=the required pitch of dots on a media sheet and M=the magnification of scan mechanism 34. Accordingly, when the beams emanating from laser diodes 51 are scanned in scan direction 52, each beam set from a row of laser diodes 51 produces 3 dots that are scanned across photoreceptor 36. Those dots, comprising three beam sets, are schematically shown to the left of chip 50 at 56, 58 and 60, respectively. The dots in each beam set reside on adjacent scan lines and are, thus, respectively separated by a distance p from each other on photoreceptor 36.

As indicated above, the requirement for a high level of dot resolution on the photoreceptor 36, accompanied by the use of a scan mechanism 34 which includes a magnification factor M, complicates the placement of laser diodes 51. Further, it is useful to be able to adjust the positions of laser diodes 51 in accordance with the specific levels of magnification present in scan mechanism 34. The Hanson patent (U.S. Pat. No. 5,691,759) described above, provides for interleaved scans of laser beams, but requires fixed distances between scan rows.

This invention departs from that arrangement by enabling a positioning of the respective laser beam sets an incrementally variable distance apart, while assuring that as the interleaved exposure of photoreceptor 36 is accomplished, no scan line is caused to overwrite a scan line produced by a positionally displaced laser beam set. More precisely, each row of laser diodes 51 (i.e., a set) is spaced from a corresponding row of laser diodes 51 in a next set by a spacing $S_d$ where $$S_d = c(1+qr)p/M \qquad (a)$$

where:
"c" is a value indicating the number of columns of laser diodes;
"r" is the number of rows of laser diodes; and
"q" is an integer value which determines inter-scan line distances.

The use of expression (a) to establish the distance between succeeding sets of laser diodes enables the laser diodes to be spaced on chip 50 in a manner which avoids inter-diode interference and thermal interactions. At a minimum, laser diodes 51 are separated in the process direction by at least a minimum distance $S_{min}$ (about 50μ), where $S_d \geq M(S_{min})$ Further, the use of expression (a) to set the spacings of the laser diodes allows the laser beam sets to produce dot spacings on photoreceptor 36 at high levels of resolution.

As will become apparent from the description below, a certain number of scan lines at the top of a media sheet will comprise incomplete swaths of raster line data. Similarly, because of the angled columnar arrangement of the respective laser diodes 51, the scanning of each thereof will start at a displaced position from laser diodes in other columns. Accordingly, depending upon the number of laser diodes and the columnar/row arrangement thereof, buffer control procedure 20 operates to only commence modulating the respective laser diodes when their respective beams reach a common edge point of photoreceptor 36, either from side to side in scan direction 52 or from top to bottom in process direction 54.

Figure 4A:
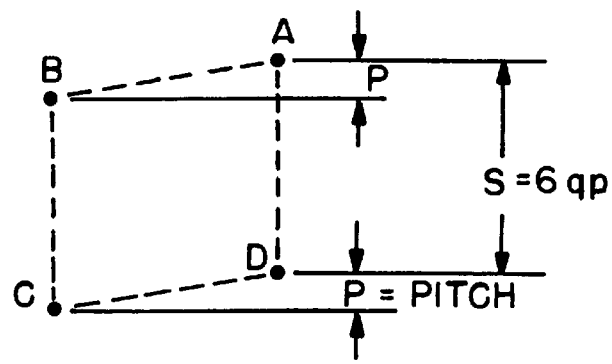
FIG. 4a shows a subset of the laser diodes of FIG. 3

Turning now to FIG. 4a, the operation of the invention will be described in the context of a 4 laser diode array which produces four laser beams A, B, C and D that are incident on photoreceptor 36. Laser beams A and B comprise a first set and laser beams C and D comprise a second set. Laser beams A and B are separated by one scan row or a pitch distance if p. Laser beams C and D are similarly spaced. As indicated to the right of the respective laser beam sets, the spacing therebetween in process direction 54 on the photoreceptor is given by the expression $$S_{PR} = c(1+qr)p = 2(1+q2)p = 6qp$$

Figure 4B:
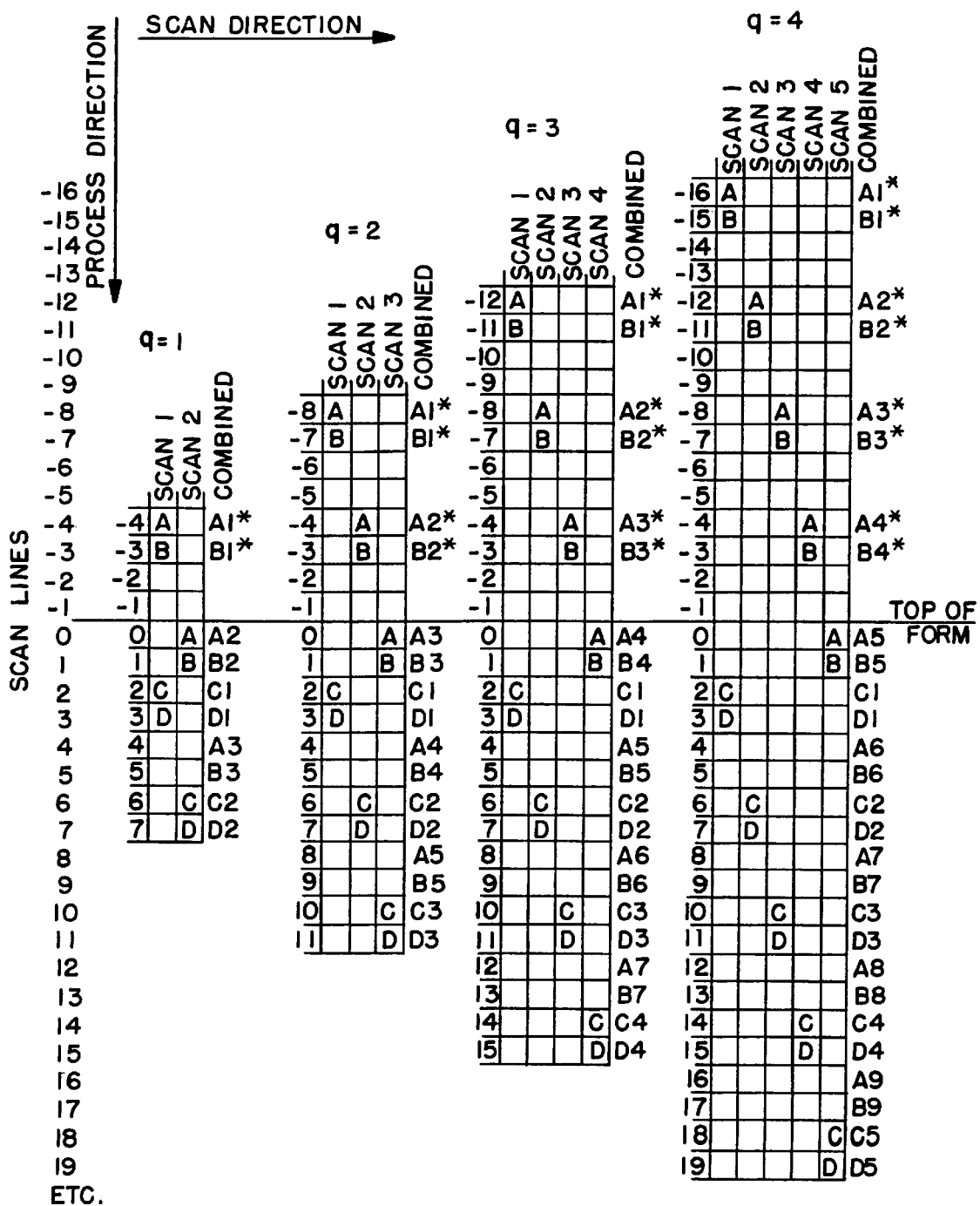

As indicated above, q may be assigned any integer value. The chart of FIG. 4b illustrates the position of laser beams A, B, C and D during succeeding scans thereof on photoreceptor 36, when the values of q are varied from 1 to 4. In the leftmost column of FIG. 4b, the scan results are shown wherein the value of q is set equal to 1. In such instance, $S_{PR}$=6p, thereby indicating that beams A and B are displaced from beams C and D on photoreceptor 36, respectively, by 6 pitch distances p. During a first pass, starting at scan line −4, scan lines −2 and −1 are not filled, whereas scan lines −4, −3, 2 and 3 are filled. During a second pass, photoreceptor 36 is moved by a distance (q·c·r)p (or 4p when q=1), so as to position laser beam A at scan line 1. Accordingly, during the second pass, scan lines 0, 1, 6 and 7 are filled. Thereafter, succeeding movements of photoreceptor 36 by the distance (q·c·r)p allows all scan lines to be filled with pixel data without any scan lines overwriting previously written scan lines.

If q=2, $S_{PR}$=10p and the scans occur as shown in q=2 column of FIG. 4b. Photoreceptor 36 is moved 8p after each scan. Note that a complete fill does not begin to occur until 8 scan lines have occurred, at which point a complete fill is produced. When q=3, a complete fill does not occur until the 13th scan line, and with q=4, a complete fill does not commence until scan line 17. In all cases, however, once a complete fill begins there is no overwriting of previously written scan line pixel data As can thus be seen, spacing succeeding rows of diodes in accordance with a chosen value of q on laser diode chip 50, and the incrementing of photoreceptor 36 by a distance (q·c·r)p after each scan, enables an interleaving of raster scan lines without creating overwrites on previously scanned lines.

If only two laser diodes are utilized to produce the interleaved scan arrangement (i.e., one laser diode per set), the aforementioned relationships hold and allow the respective diodes to be spaced apart by a desired distance $S_d$. If plural columns of laser diodes are utilized, then each of the laser diodes positioned along a row must be arranged so that the respective dots which they project onto photoreceptor 36 are offset by the desired dpi pitch distance. Such spacing can be achieved by offsetting the respective positions of the laser diodes in the scan direction.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A laser printer for producing a raster image of plural raster scan lines of pixels having a scan line to scan line pitch distance of p, said printer comprising:

a photoreceptor;

n laser sources, where n≧4, a first subset of said n laser sources including at least a first pair of laser sources and a second subset of said n laser sources including at least a second pair of laser sources, each said subset when imaged on said photoreceptor producing a pair of spots separated by p in a direction of movement of said photoreceptor, corresponding pairs of spots from said first subset and said second subset separated by a distance $S_{PR}=c(1+qr)p$, where: c=number of laser sources in each said subset, q=an integer ≧1, and r=number of subsets;

scan means for simultaneously scanning optical beams from said n laser sources in parallel paths across said photoreceptor;

image buffer memory means for storing said plural raster scan lines of pixel values comprising an image;

control means for modulating said optical beams with said plural raster scan lines of pixel values in accordance with a correspondence of (i) scan lines in said image and (ii) positions of said optical beams on said photoreceptor; and means for moving said photoreceptor by a distance (q·c·r)p between each scan of said scan means.

2. The laser printer as recited in claim 1, wherein said scan means further comprises:

optical means which magnifies spacings between said optical beams by a factor of M, each said subset of laser sources separated by a distance $S_d$ in said direction of movement of said photoreceptor by at least a minimum distance $S_{min}$, and wherein $S_d \geq M(S_{min})$.

3. The laser printer as recited in claim 2, wherein said control means does not commence feeding said pixel values comprising said image which is to be printed until a preset number of scans of said n laser sources have occurred, said preset number based at least in part on the value of q.

4. The laser printer as recited in claim 1, wherein said control means includes means for selectively allocating raster scan line data to modulate said n laser sources.

5. The laser printer as recited in claim 1, wherein said control means commences feeding said pixel values comprising said image during each of said scan lines when an image region on said photoreceptor is reached, said image region set so that modulation of all laser sources is enabled to commence at a same position in each scan.

6. A laser printer for producing a raster image of plural raster scan lines of pixels having a scan line to scan line pitch distance of p, said printer comprising a photoreceptor;

n laser sources, where n≧2, a first subset of said n laser sources including at least one laser source, and a second subset of said n laser sources including at least a second laser source, corresponding pairs of spots produced on said photoreceptor by said first subset and said second subset separated by a distance $S_{PR}=c(1+qr)p$, where: c=number of laser sources in each said subset, q=an integer ≧2, r=number of subsets;

scan means for simultaneously scanning optical beams from said n laser sources in parallel paths across said photoreceptor;

image buffer memory means for storing plural raster scan lines of pixel values comprising an image;

control means for modulating said optical beams with raster scan lines of pixel values in accordance with a correspondence of (i) scan lines in said image and (ii) positions of said optical beams on said photoreceptor; and means for moving said photoreceptor by a distance (q·c·r)p between each scan of said scan means.

7. The laser printer as recited in claim 6, wherein said scan means further comprises:

optical means which magnifies said optical beams and spacings therebetween by a factor of M, each said subset of laser sources separated by a distance $S_d$ in a direction of movement of said photoreceptor by at least a minimum distance $S_{min}$, and wherein $S_d \geq M(S_{min})$.

8. The laser printer as recited in claim 6, wherein said control means includes means for selectively allocating raster scan line data to modulate said n laser sources.

9. The laser printer as recited in claim 6, wherein said control means does not commence feeding said pixel values comprising said image which is to be printed until a preset number of scans of said laser sources have occurred, said preset number based at least in part on the value of q.

10. A method for controlling a laser printer to produce a raster image comprising plural raster scan lines of pixels, each of said raster scan lines separated from an adjacent raster scan line by a pitch distance p, said printer including a photoreceptor, an image buffer for storing plural raster scan lines of pixel values comprising an image, and n laser sources, where n≧4, a first subset of said n laser sources including at least a first pair of laser sources and a second subset of said n laser sources including at least a second pair of laser sources, each said subset when imaged on said photoreceptor producing a pair of spots separated by p in a direction of movement of said photoreceptor, corresponding pairs of spots from said first subset and said second subset separated by a distance $S_{PR}=c(1+qr)p$, where: c=number of laser sources in each said subset, q=an integer ≧1, and r=number of subsets, said method comprising the steps of:

a. simultaneously scanning optical beams of said first subset and said second subset across said photoreceptor while modulating said optical beams of said first subset with pixel values from a first group of contiguous raster scan lines from said image buffer and modulating said optical beams of said second subset with pixel values from a second group of contiguous raster scan lines from said image buffer, corresponding scan lines of said first group and second group separated by said distance $S_{PR}=c(1+qr)p$ when imaged on said photoreceptor; and b. moving said photoreceptor by a distance $(q \cdot c \cdot r)p$ at an end of each scan; and c. repeating steps a and b until said photoreceptor has been exposed in accordance with said pixel values of said image.

11. The method as recited in claim 10, wherein said laser printer in step a) is inhibited from modulating said optical beams with said pixel values comprising said image until a preset number of scans of said n laser sources have occurred, said preset number based at least in part on the value of q.

12. The method as recited in claim 10, wherein said pixel values comprising said image are fed to modulate said laser sources during each scan line when an image region on said photoreceptor is reached, said image region subset so that modulation of said n laser sources is enabled to commence at a same point in each said scan line.

13. A method for controlling a laser printer to produce a raster image comprising plural raster scan lines of pixels, each of said raster scan lines separated from an adjacent one of said raster scan lines by a pitch distance p, said printer including a photoreceptor, an image buffer for storing plural raster scan lines of pixel values comprising an image, and n laser sources, where $n \geq 2$, a first subset of said n laser sources including at least a first laser source and a second subset of said n laser sources including at least a second laser source, each said subset when imaged on said photoreceptor producing at least a pair of spots separated by a distance $S_{PR}=c(1+qr)p$, where: c=number of laser sources in each subset, q=an integer $\geq 2$, and r=number of subsets, said method comprising the steps of:

a. simultaneously scanning optical beams of said first subset and said second subset across said photoreceptor while modulating at least one of said optical beams of said first subset with pixel values from a first raster scan line from said image buffer and modulating at least one of said optical beams of said second subset with pixel values from a second raster scan line from said image buffer, wherein a corresponding said first raster scan line and a said second raster scan line are separated by said distance $S_{PR}=c(1+qr)p$ when imaged on said photoreceptor;

b. moving said photoreceptor by a distance $(q \cdot c \cdot r)p$ at an end of each scan; and c. repeating steps a and b until said photoreceptor has been exposed in accordance with said pixel values of said image.

14. The method as recited in claim 13, wherein said laser printer in step a) is inhibited from modulating said optical beams with said pixel values comprising said image until a preset number of scans of said laser sources have occurred, said preset number based at least in part on the value of q.

15. The method as recited in claim 13, wherein said pixel values comprising said image are fed to modulate said n laser sources during each scan line when an image region on said photoreceptor is reached, said image region subset so that modulation of said n laser sources is enabled to commence at a same point in each said scan line.

* * * * *